United States Patent
Yue et al.

(10) Patent No.: US 11,498,061 B2
(45) Date of Patent: Nov. 15, 2022

(54) PREPARATION METHOD OF MESOPOROUS FE—CU-SSZ-13 MOLECULAR SIEVE

(71) Applicant: Fu Zhou University, Fujian (CN)

(72) Inventors: Yuanyuan Yue, Fujian (CN); Ben Liu, Fujian (CN); Nangui Lv, Fujian (CN); Xiaojun Bao, Fujian (CN); Jie Liu, Fujian (CN); Tinhai Wang, Fujian (CN); Pei Yuan, Fujian (CN); Haibo Zhu, Fujian (CN); Zhengshuai Bai, Fujian (CN); Qingyan Cui, Fujian (CN)

(73) Assignee: Fu Zhou University

( * ) Notice: Subject to any disclaimer, the term of this patent is extended or adjusted under 35 U.S.C. 154(b) by 129 days.

(21) Appl. No.: 16/967,449

(22) PCT Filed: Dec. 27, 2018

(86) PCT No.: PCT/CN2018/124494
§ 371 (c)(1),
(2) Date: Aug. 5, 2020

(87) PCT Pub. No.: WO2020/098104
PCT Pub. Date: May 22, 2020

(65) Prior Publication Data
US 2021/0370279 A1 Dec. 2, 2021

(30) Foreign Application Priority Data
Nov. 14, 2018 (CN) .......................... 201811354909.1

(51) Int. Cl.
| | | |
|---|---|---|
| B01J 29/76 | (2006.01) | |
| B01J 37/30 | (2006.01) | |
| B01D 53/86 | (2006.01) | |
| B01D 53/94 | (2006.01) | |
| B01J 37/00 | (2006.01) | |
| B01J 37/04 | (2006.01) | |
| B01J 37/06 | (2006.01) | |
| B01J 37/08 | (2006.01) | |
| C01B 39/48 | (2006.01) | |
| B01J 35/10 | (2006.01) | |

(52) U.S. Cl.
CPC ........ B01J 29/763 (2013.01); B01D 53/8628 (2013.01); B01D 53/9418 (2013.01); B01J 37/009 (2013.01); B01J 37/04 (2013.01); B01J 37/06 (2013.01); B01J 37/082 (2013.01); B01J 37/30 (2013.01); C01B 39/48 (2013.01); B01D 2255/20738 (2013.01); B01D 2255/20761 (2013.01); B01D 2255/50 (2013.01); B01J 35/1019 (2013.01); B01J 35/1023 (2013.01); B01J 35/1061 (2013.01); B01J 2229/183 (2013.01); C01P 2002/72 (2013.01); C01P 2006/17 (2013.01)

(58) Field of Classification Search
None
See application file for complete search history.

(56) References Cited

U.S. PATENT DOCUMENTS

| | | | |
|---|---|---|---|
| 4,544,538 A | 10/1985 | Zones | |
| 2012/0208691 A1* | 8/2012 | Bull | B01J 29/84 502/60 |
| 2015/0360964 A1* | 12/2015 | Rimer | B01J 29/7015 423/700 |

FOREIGN PATENT DOCUMENTS

| | | | |
|---|---|---|---|
| CN | 102614908 A | | 8/2012 |
| CN | 108452841 | * | 2/2018 |
| CN | 108557841 A | | 9/2018 |

* cited by examiner

*Primary Examiner* — Sheng H Davis
(74) *Attorney, Agent, or Firm* — Bayramoglu Law Offices LLC

(57) ABSTRACT

A method of preparing a mesoporous Fe—Cu—SSZ-13 molecular sieve includes activating an aluminum source, a silicon source, an iron source and a copper source respectively; mixing the activated minerals with sodium hydroxide, water and a seed crystal at 25-90° C., while controlling feeding amounts of respective raw materials so that molar ratios of respective materials in a synthesis system are as follows: $SiO_2/Al_2O_3=10$-$100$, $SiO_2/Fe_2O_3=30$-$3000$, $SiO_2/CuO=1$-$100$, $Na_2O/SiO_2=0.1$-$0.5$, $H_2O/SiO_2=10$-$50$, template/$SiO_2=0.01$-$0.5$; adding an acid source to adjust pH of the system for first aging; and adding the acid source again to adjust the pH of the system for second aging to obtain aged gel; pouring an aged mixture into a kettle; cooling a crystallized product and filtering to remove a liquor; washing a filter cake; drying to obtain a solid; performing ion exchange; and filtering, washing and drying the solid to obtain powder; and placing the powder in a muffle furnace.

10 Claims, 1 Drawing Sheet

PREPARATION METHOD OF MESOPOROUS FE—CU—SSZ-13 MOLECULAR SIEVE

BACKGROUND OF THE INVENTION

1. Technical Field

The invention belongs to the technical field of environmental-friendly catalysts, and in particular relates to a preparation method of a mesoporous Fe—Cu—SSZ-13 molecular sieve, and application of the mesoporous Fe—Cu—SSZ-13 molecular sieve in selective catalytic reduction (SCR) reactions of nitrogen oxides.

2. Description of Related Art

At present, nitrogen oxides have become an important air pollutant that is next only to inhalable particles and sulfur dioxide, and they are mainly from the emissions of fluid catalytic cracking (FCC) flue gases, automobile exhaust gases and thermal power plant exhaust gases. In recent years, the ammonia selective catalytic reduction (NH—SCR) denitration technology has gradually become a focus of research, and is considered by a large number of experts and scholars as the most potential denitration technology. Due to the characteristics such as regular and ordered structure, adjustable framework composition, high specific surface area, high adsorption capacity, high cation exchangeability, good pore shape selectivity, and excellent thermal stability and chemical stability, molecular sieves have been widely used in fields such as petrochemical industry, fine chemical industry and green chemical industry. In recent years, heteroatom-modified SSZ-13 molecular sieves have become one of the research hotspots in the environment protection field, and especially Fe- or Cu- modified SSZ-13 molecular sieves have a broad application prospect in the field of denitration.

Currently, the most commonly used method for synthesizing the SSZ-13 molecular sieve is a hydrothermal synthesis method using N,N,N-trimethyl-1-adamantyl ammonium hydroxide (TMADAOH) as a template. The molecular sieve synthesized using this method is featured with ordered pore structure and high hydrothermal stability, however, this method has the disadvantage that the template itself is synthesized in complicate steps at high cost, which limits the application of the SSZ-13 molecular sieve in the industrialization process.

U.S. Pat. No. 8,007,764B2 discloses a method for synthesizing an SSZ-13 molecular sieve using benzyl trimethyl quaternary ammonium ions (BzTMA$^+$) as a structure-directing agent to partially substitute TMADA$^+$ cations. BzTMA$^+$ ions are relatively low in price, but are irritating to a human body and may cause some harms to the human body. Therefore, the BzTMA$^+$ ions cannot be taken as the most suitable substitute for the structural-directing agent TMADA$^+$.

In 2011, Xiaofengshou Research Group from Zhejiang University (Chem. Commun. 2011, 47, 9789) reported a new method for synthesizing a Cu—SSZ-13 molecular sieve in one step using a copper amine complex. The synthesized molecular sieve showed an excellent catalytic performance in the denitration reaction for diesel vehicles. According to this method, the cheap copper amine complex is used as a template to greatly reduce the cost in the synthesis of the Cu—SSZ-13 molecular sieve. However, a silicon source used is silica sol, and an aluminum source used is sodium metaaluminate. Consequently, the raw materials are slightly high in price, and the silica sol has a low Si content (generally 30-40%) and is a liquid which is difficult to store and transport, so that the industrial product cost remains slightly high.

Diatomite is a kind of biological sedimentary rock that is preserved in the form of remains of diatom that biologically absorbs soluble silica in water under certain physical and chemical conditions of light, temperature, nutrients and the like. The diatomite is mainly used as a filter aid, a filler and a catalyst carrier in industry. The diatomite has a general theoretical structural formula of $Mg_8[Si_{12}O_{30}](OH)_4(OH_2)_4 \cdot 8H_2O$, which is a 2:1 type chain layered structure with a main chemical component of amorphous SiO2. It can be pretreated by purification, activation and the like to serve as a main silicon source, part of an aluminum source and an iron source for synthesizing the molecular sieve.

Rectorite is a 1:1 regular interlayer clay mineral of dioctahedral mica and dioctahedral montmorillonite, with a crystal chemical formula of $K_x(H_2O)\{Al_2[Al_xSi_4-xO_{10}](OH)_2\}$. It has the properties such as high temperature resistance (refractoriness up to 1660° C.), viscosity, plasticity, dispersibility, expansibility, adsorbability, hydrability, cation exchangeability, bilayer colloid and electrokinetic potential. The rectorite can be pretreated by purification, activation and the like to serve as a main aluminum source, part of a silicon source and an iron source for synthesizing the molecular sieve.

At present, the copper ore resources in China has the inventory of 19.15 million tons, the resource quantity of 31.77 million tons, the basic reserves of 30.42 million tons, and the total quantity up to 62.18 million tons, ranking seventh in the world. There are more than 280 types of copper minerals, mainly including tenorite, bornite, magnetite, malachite, covellite, chalcopyrite, etc. It can be seen that the copper ores in China are rich in reserves and diverse in types, and some copper ores are expected to become a copper source for synthesizing the molecular sieves after being crushed into powder, roasted or treated in other forms.

CN201510651013.X discloses a method for preparing a Beta molecular sieve from modified diatomite without an organic template, including the following steps: dissolving sodium hydroxide in water; adding the modified diatomite and a seed crystal of Beta molecular sieve under stirring; adding an aluminum source and continuing stirring for 1-5 h; and performing hydrothermal crystallization to obtain the Beta molecular sieve. Among them, based on the oxides, the molar amounts of respective components are as follows: $SiO_2$: $Al_2O_3$: $Na_2O$:$H_2O$=1:0.05-0.2:0.2-0.35:3-8; and the seed crystal of Beta molecular sieve has a $SiO_2/Al_2O_3$ molar ratio of 20-30:1, and the added mass of the seed crystal of Beta molecular sieve is 1-2% of the modified diatomite. This invention reduces the water-to-silicon ratio by introducing the diatomite, and thus increases the yield of single synthesis by increasing the feeding amount of the raw materials for single synthesis. However, the aluminum source used in this invention is still a chemical reagent.

CN201510648172.4 discloses a method for synthesizing a Cr—Al-ZSM-22 molecular sieve using modified diatomite as a main raw material, without an organic template and a seed crystal. This method includes the following steps: stirring to dissolve a soluble aluminum salt and a soluble chromium salt in deionized water to form a chromium-aluminum solution; adding alkali under stirring; then adding the modified diatomite and continuing stirring evenly; finally placing a resultant in a reaction kettle for crystallization; and filtering, washing and drying a product to obtain raw powder of the Cr—Al-ZSM-22 molecular. This invention synthesizes a high-crystallinity Cr—Al-ZSM-22 molecular sieve rapidly using the modified diatomite as a main raw material, without using the organic template and the seed crystal. In addition to the absence of the organic template and the seed crystal, the invention shortens the crystallization time and reduces energy consumption and synthesis cost, and the introduction of chromium is helpful to improve the catalytic activity and selectivity.

CN201710270575.9 discloses a stepped-pored Beta molecular sieve, which is synthesized by evenly mixing activated minerals, an alkali source, a supplementary silicon source, a seed crystal and deionized water at a certain ratio, and then performing one-step hydrothermal crystallization, wherein kaolin or rectorite activated by a sub-molten salt is used as all of the aluminum source and part of the silicon source, and no organic template is added. This method provides the following advantages: a natural mineral activated by the sub-molten salt is used as all of the aluminum sources and part of the silicon sources, and no organic template is used in the synthesis process, which not only greatly reduces the synthesis cost of the Beta molecular sieve, but also significantly increases the greenness of the production process of the molecular sieves.

Although the molecular sieves of FAU types and other types are synthesized using the diatomite or rectorite as a raw material, there have been no reports related to the preparation of the Fe—Cu—SSZ-13 molecular sieve using minerals as the main source of silicon, aluminum, iron and copper. Therefore, a new technology that is studied and developed for synthesizing the Fe—Cu—SSZ-13 type molecular sieve using the minerals as the source of silicon, aluminum, iron and copper based on the use of cheap templates, is expected to further reduce the production cost of the molecular sieve, and has an important scientific research value and a broad industrial application prospect.

BRIEF SUMMARY OF THE INVENTION

To solve the above problems, the invention provides a novel synthesis method of a mesoporous Fe—Cu—SSZ-13 molecular sieve, which is characterized in that: the mesoporous Fe—Cu—SSZ-13 molecular sieve is synthesized in situ using a one-pot method by adjusting a pH value of a synthesis system in stages and by synthesizing a Fe—Cu—SSZ-13 type molecular sieve using minerals as sources of silicon, aluminum, iron and copper, without using a mesoporous (microporous) template and performing posttreatment; ion exchange can be carried out directly without removing the microporous template; a temperature window is wide and the contents of Fe and Cu are adjustable; the content of Fe in a framework of the molecular sieve is much higher than those in pores and surfaces; and copper mainly exists in a bivalent form, and there is no agglomerated copper oxides, that is, the iron and copper in the molecular sieve are mostly present in the form of denitration active sites.

A mesoporous Fe—Cu—SSZ-13 molecular sieve includes the following raw materials: deionized water, an aluminum source, a silicon source, an iron source, a copper source, an acid source and a template.

The aluminum source is one or a mixture of more of mica, alumite, bauxite, diatomite, rectorite, or natural zeolite; the silicon source is one or a mixture of more of bauxite, diatomite, rectorite, natural zeolite, or opal; the iron source is one or a mixture of more of bauxite, diatomite, rectorite, pyrite, mica hematite, or red mud; the copper source is one or a mixture of more of tenorite, bornite, magnetite, malachite, covellite, or chalcopyrite; the acid source is one or a mixture of more of 2-hydroxy-tricarballylic acid, sulfurous acid and nitrous acid, sulfuric acid, hydrochloric acid, nitric acid, oxalic acid, or acetic acid; and the template is one or a mixture of more of diaminomethylpyridine, diaminopropane, p-butylcyclohexanecarboxylic acid, methylediamine, tetraethylenepentamine.

A preparation method of a mesoporous Fe—Cu—SSZ-13 molecular sieve includes the following steps:

(1) activation of minerals:

(2) mixing the activated minerals with sodium hydroxide, water and a seed crystal at 25-90° C., while controlling the feeding amounts of respective raw materials so that molar ratios of respective materials in a synthesis system are as follows: $SiO_2/Al_2O_3$=10-100, $SiO_2/Fe_2O_3$=30-3000, $SiO_2/CuO$=1-100, $Na_2O/SiO_2$=0.1-0.5, $H_2O/SiO_2$=10-50, template/$SiO_2$=0.01-0.5; adding an acid source after mixing to adjust pH of the system to 5-13 for first aging; and adding the acid source again to adjust the pH of the system to 5-13 for second aging to obtain aged gel;

(3) pouring an aged mixture into a polytetrafluoroethylene-lined stainless-steel crystallization kettle for crystallization; after the crystallization is completed, cooling a crystallized product and filtering to remove a mother liquor; washing a filter cake with deionized water to neutrality; drying to obtain a solid; then performing ion exchange on the solid; and filtering, washing and drying the ion-exchanged solid to obtain powder, wherein the drying is performed at 80-150° C. overnight;

(4) placing the powder obtained in step (3) in a muffle furnace for roasting to obtain the Fe—Cu—SSZ-13 molecular sieve.

The aging in step (2) is carried out under conditions of 10-80° C., with an aging time of 2-12 hours.

The molar ratios of respective materials in the synthesis system are as follows: $SiO_2/Al_2O_3$=10-100, $SiO_2/Fe_2O_3$=30-2550, $SiO_2/CuO$=20~100, $Na_2O/SiO_2$=0.1-0.5, $H_2O/SiO_2$=10~50, and template/$SiO_2$=0.01-0.5

The amount of the seed crystal added in step (2) is 1-15% of the total mass of SiO2 in the synthesis system.

The crystallization in step (3) is carried out at 100-190° C., with a crystallization time of 12-120 h.

A detailed method of the ion exchange in step (3) is as follows: performing ion exchange on the dried solid and 0.1-2M HNO3 solution at a mass ratio of 1:10 to 1:100, and heating and stirring at 10-80° C. for 3-8 h.

The roasting in step (3) lasts for 4-10 h, with a roasting temperature of 500-600° C.

The Fe—Cu—SSZ-13 catalyst prepared is applied to the selective catalytic reduction reactions of nitrogen oxides.

In summary, the invention provides a Fe—Cu—SSZ-13 molecular sieve and a synthesis method thereof. The Fe—Cu—SSZ-13 molecular sieve of the invention has the following advantages.

(1) The shortcomings such as complicated steps and high cost of the traditional immersion or ion exchange preparation method are overcome. The mesoporous Fe—Cu—SSZ-13 molecular sieve is synthesized in situ using the one-pot method by adjusting the pH value of the synthesis system in stages, and the ion exchange can be carried out without removing the microporous template. The mesoporous Fe—Cu—SSZ-13 molecular sieve with an excellent SCR denitration performance can be synthesized economically, environmentally and efficiently, and has a NO conversion rate higher than 90% in a wide temperature window (150-700° C.), with high $N_2$ selectivity (>99%).

(2) By first synthesizing the Fe—Cu—SSZ-13 in situ with the one-pot method using the minerals as the source of silicon, aluminum, iron and copper, the mesoporous Fe—Cu—SSZ-13 molecular sieve is synthesized in situ using the one-pot method by adjusting the pH value of the synthesis system in stages. Moreover, the ion exchange can be carried out directly without removing the microporous template. The mesoporous Fe—Cu—SSZ-13 molecular sieve has a wide temperature window and is adjustable in the contents of Fe and Cu. Meanwhile, with the minerals as the raw materials for synthesizing the molecular sieve, the advantages of rich raw material sources and low cost are achieved, and moreover, the problems of high cost, environmental unfriendliness and heavy pollution involving the discharge of large amounts of waste liquid during the traditional preparation of the chemical reagents are solved.

(3) The mesoporous Fe—Cu—SSZ-13 molecular sieve with excellent SCR denitration performance is synthesized economically, environmentally and efficiently in a short period. The problems such as complex technology, long process, and easy aggregation of Fe or Cu, long synthesis cycle faced by the traditional immersion method are successfully solved. Meanwhile, the use of mesoporous (microporous) templates is avoided, and the problems such as the generation of a large amount of ammonia nitrogen and other polluting gases in a demolding process, and the collapse of the pores of the molecular sieve caused by removing the template can be effectively solved.

(4) The prepared Fe—Cu—SSZ-13 is a stepped-pored catalytic material having the advantages of high specific surface area, large adsorption capacity, and rich acid sites, which will facilitate the full contact between reaction substances and the active sites, and meanwhile, solves the long-standing problems such as internal mass transfer and diffusion of the traditional microporous molecular sieves.

(5) The invention synthesizes the mesoporous Fe—Cu—SSZ-13 molecular sieve in situ using the one-pot method by adjusting the pH value of the synthesis system in stages, without using the mesoporous (microporous) template and the posttreatment. Moreover, the ion exchange can be carried out without removing the microporous template. The distribution of the mesopores of the product prepared in a short period are concentrated at 5-50 nm; the specific surface area is 380-700 m$^2$/g, and the external specific surface area is 120-500 m$^2$/g. The content of $Fe_2O_3$ in the molecular sieve accounts for 0.1-10% of the total weight of the molecular sieve, in which the content of Fe in the framework accounts for more than 95% of the total iron content and Fe is evenly distributed in the framework; the content of CuO in the molecular sieve is 0.1-10% of the total weight of the molecular sieve, in which the content of $Cu^{2+}$ accounts for more than 90% of the total copper content, and $Cu^{2+}$ is evenly distributed on the inner surface of the molecular sieve.

The synthetic process route provided by the invention can greatly reduce the production cost in the synthesis of the molecular sieve, and greatly improve the greenness of the synthesis process. The resulting molecular sieve has the characteristics of low cost and better physical and chemical properties.

DETAILED DESCRIPTION OF THE INVENTION

Figure 1:
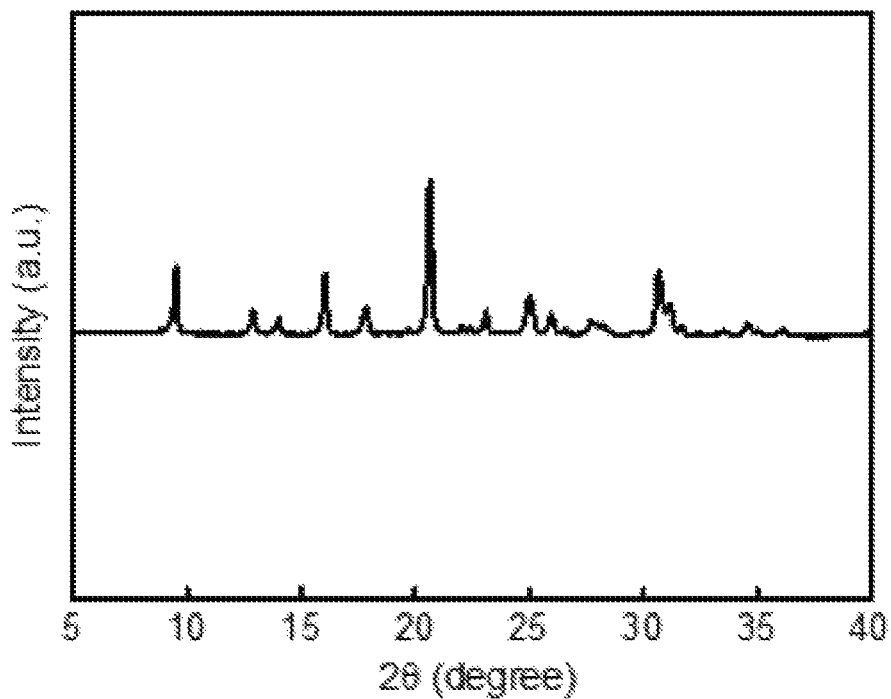
FIG. 1 is an X-ray diffraction (XRD) spectrum of a Fe—Cu—SSZ-13 molecular sieve prepared in Embodiment 1 of the invention.
Figure 2:
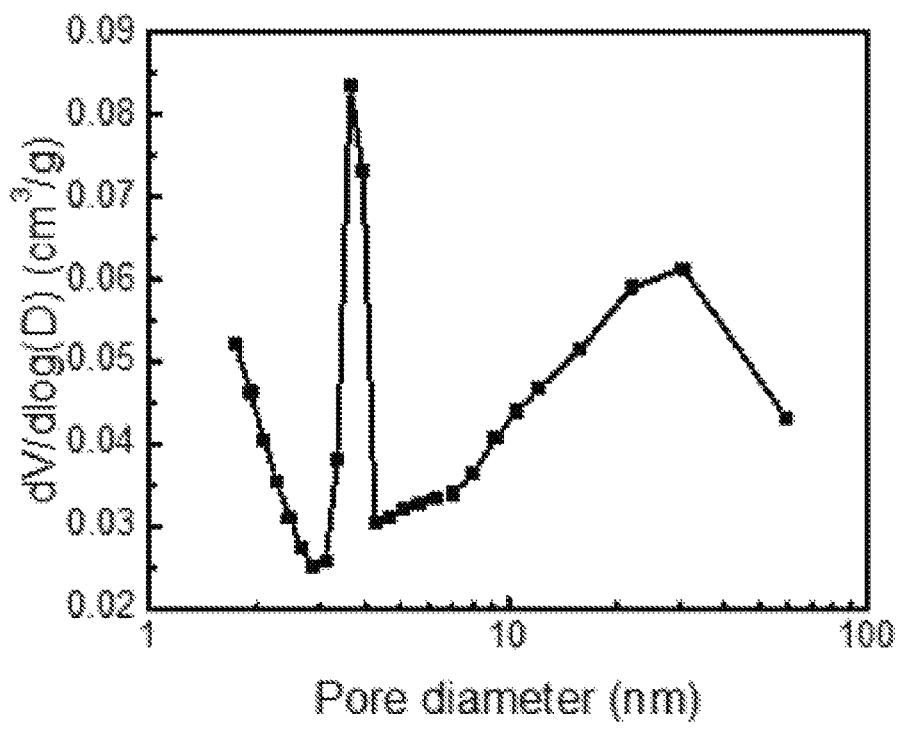
FIG. 2 is a diagram showing the pore diameter distribution of the Fe—Cu—SSZ-13 molecular sieve prepared in Embodiment 1 of the invention.

The invention will be illustrated below in terms of implementation processes and beneficial effects in detail through specific embodiments, which is intended to help better understand the essence and characteristics of the invention and is not intended to limit the implementable scope of the invention.

Embodiment 1

Preparation of Reagents

Selection of minerals: the used rectorite, diatomite, bornite and tenorite are commercially available products. The rectorite includes the following main components in terms of content: 43.2 wt % of $SiO_2$ is, 37.2 wt % of $Al_2O_3$, and 0.5 wt % of $Fe_2O_3$. The diatomite includes the following main components in terms of content: 93.2 wt % of $SiO_2$, 3.3 wt % of $Al_2O_3$, and 1.5 wt % of $Fe_2O_3$. The bornite includes the following components in terms of content: 63.33 wt % of Cu, and 11.12 wt % of Fe. The tenorite includes 79.89 wt % of Cu in content.

Activation of minerals: the commercially available diatomite was dried and crushed into powder, and 50.00 g of the diatomite powder was weighed and roasted at 800° C. for 4 hours for later use; the commercially available bornite was dried and crushed into powder, and 50.00 g of the bornite powder was weighed and roasted at 790° C. for 4 hours for later use; the commercially available tenorite was dried and crushed into powder, and 50.00 g of the tenorite powder was weighed and roasted at 850° C. for 4 hours for later use; and 60.00 g of rectorite, 72 g of sodium hydroxide, and 300 g of water were weighed, mechanically stirred at room temperature for 1 h, then activated in an oven at 255° C. for 12 h, and then crushed for later use.

Preparation of the molecular sieve: 2.79 g of the activated rectorite and 4.04 g of the NaOH were weighed and dissolved in 50 g of deionized water; 6.5 g of TEPA was added dropwise; after stirring for 5 min, 6.7 g of the activated tenorite was added; after stirring for 1 h, 8.08 g of the diatomite was added; 1.2 g of sulfuric acid was added to adjust the pH to 11; then a resulting product was placed in a water bath at 70° C. for 4 h, and then cooled to room temperature; 1.3 g of sulfuric acid was added to adjust the pH to 10; and a resulting product was mixed and stirred at 35° C. for 4 h. A resulting mixture was poured into a polytetrafluoroethylene-lined stainless-steel crystallization kettle, and heated to 140° C. for static crystallization for 72 h. After the crystallization is completed, a resulting product was cooled and filtered to remove a mother liquor, then washed to neutrality, and dried at 120° C. to obtain a product of sodium-type Fe—Cu—SSZ-13 molecular sieve; the sodium-type Fe—Cu—SSZ-13 molecular sieve was exchanged with 0.2 M HNO3 at 80° C. for 6 h, and filtered to remove a mother liquor; and a filter cake was washed to neutrality with deionized water, and then dried to obtain a hydrogen-type Fe—Cu—SSZ-13 molecular sieve. The mesoporous pore diameter of the obtained sample is mainly concentrated at 40 nm; the specific surface area is 550 m$^2$/g; the external specific surface area is 500 m$^2$/g; and the content of $Fe_2O_3$ accounts for 1.5% of the total weight of the molecular sieve, with the iron content in the framework accounts for 95% of the total iron content. The CuO content is 4.5% of the total weight of the molecular sieve, with the content of bivalent copper ions accounting for 93% of the total copper content.

Embodiment 2

This embodiment provides a Fe—Cu—SSZ-13 catalyst, and the preparation steps are the same as those in Embodiment 1, only with some parameters altered as follows:

Preparation of the molecular sieve: 0.418 g of the activated rectorite and 1.11 g of the NaOH were weighed and dissolved in 50 g of deionized water; 5.255 g of TEPA was added dropwise; after stirring for 5 min, 0.34 g of Cu(NO$_3$)$_2$ and 0.7 g of the activated tenorite was added; after stirring for 1 h, 4.3 g of the diatomite was added; 1 g of hydrochloric acid was added to adjust the pH to 13; then a resulting product was placed in a water bath at 60° C. for 4 h, and then cooled to room temperature; 2 g of hydrochloric acid was added to adjust the pH to 10; and a resulting product was mixed and stirred at 35° C. for 4 h. A resulting mixture was poured into a polytetrafluoroethylene-lined stainless-steel crystallization kettle, and heated to 140° C. for static crystallization for 72 h. After the crystallization is completed, a resulting product was cooled and filtered to remove a mother liquor, then washed to neutrality, and dried at 120° C. to obtain a product of sodium-type Fe—Cu—SSZ-13 molecular sieve; the sodium-type Fe—Cu—SSZ-13 molecular sieve was exchanged with 0.15 M HNO$_3$ at 70° C. for 9 h, and filtered to remove a mother liquor; and a filter cake was washed to neutrality with deionized water, and then dried to obtain a hydrogen-type Fe—Cu—SSZ-13 molecular sieve. The mesoporous pore diameter of the obtained sample is mainly concentrated at 35 nm; the specific surface area is 560 m$^2$/g; the external specific surface area is 420 m$^2$/g; and the content of Fe$_2$O$_3$ accounts for 1% of the total weight of the molecular sieve, with the iron content in the framework accounts for 97% of the total iron content. The CuO content is 2% of the total weight of the molecular sieve, with the content of bivalent copper ions accounting for 90% of the total copper content.

Embodiment 3

This embodiment provides a Fe—Cu—SSZ-13 catalyst, and the preparation steps are the same as those in Embodiment 1, only with some parameters altered as follows:

Preparation of the molecular sieve: 2.28 g of the activated rectorite and 1 g of the NaOH were weighed and dissolved in 50 g of deionized water; 3 g of acetic acid was added to adjust the pH to 10; 5.3 g of TEPA was added dropwise; after stirring for 5 min, 0.234 g of the bornite was added; after stirring for 1 h, 2.73 g of the diatomite was added; 1.1 g of iron nitrate nonahydrate was added; then a resulting product was placed in a water bath at 70° C. for 4 h, and then cooled to room temperature; 1 g of acetic acid was added to adjust the pH to 11; and a resulting product was mixed and stirred at 35° C. for 4 h. A resulting mixture was poured into a polytetrafluoroethylene-lined stainless-steel crystallization kettle, and heated to 140° C. for static crystallization for 72 h. After the crystallization is completed, a resulting product was cooled and filtered to remove a mother liquor, then washed to neutrality, and dried at 120° C. to obtain a product of sodium-type Fe—Cu—SSZ-13 molecular sieve; the sodium-type Fe—Cu—SSZ-13 molecular sieve was exchanged with 0.15 M HNO$_3$ at 70° C. for 9 h, and filtered to remove a mother liquor; and a filter cake was washed to neutrality with deionized water, and then dried to obtain a hydrogen-type Fe—Cu—SSZ-13 molecular sieve. The mesoporous pore diameter of the obtained sample is mainly concentrated at 35 nm; the specific surface area is 660 m$^2$/g; the external specific surface area is 520 m$^2$/g; and the content of Fe$_2$O$_3$ accounts for 6% of the total weight of the molecular sieve, with the iron content in the framework accounts for 97% of the total iron content. The CuO content is 3% of the total weight of the molecular sieve, with the content of bivalent copper ions accounting for 90% of the total copper content.

Embodiment 4

In this embodiment, the catalyst prepared in Embodiment 1 was used in a fixed-bed reaction for activity testing, including the following steps:

The catalyst A obtained in Embodiment 1 above was tabletted and sieved, and catalyst particles of 20-40 meshes were taken for activity evaluation. A catalyst activity evaluation device is an atmospheric-pressure micro fixed-bed reaction device, which is a reaction system composed of a gas mixing and preheating furnace and a reaction furnace, and a reactor is a quartz tube with an inner diameter of 7 mm. In the process of the experiment, the reaction was carried out in a temperature-programmed manner, with a temperature controller for controlling the temperature of the heating furnace. When reaching a data collection point, 30-minute stay was reserved for data processing and recording. Reaction conditions were as follows: 500 ppm of NO, 500 ppm of NH3, 5 v % of O$_2$, N$_2$ as a balance gas, the total gas flow being 600 mL/min, 200 mg of the catalyst used, and the reaction volume space velocity being 180000 h−1. The concentrations of NO, NH$_3$ and NO$_2$ were all qualitatively and quantitatively analyzed online by a flue gas analyzer (Testo340, Testo AG, German). The concentration of N$_2$O was measured a Fourier transform infrared spectrometer (Nicolet iS50) equipped with a gas cell having a 2-m optical path.

Embodiment 5

In this embodiment, the catalyst prepared in Embodiment 1 was used in a fixed-bed reaction for activity testing; and the steps were the same as those in Embodiment 4, with a parameter variation as follows: the catalyst was replaced by the catalyst prepared in Embodiment 2.

Embodiment 6

In this embodiment, the catalyst prepared in Embodiment 1 was used in a fixed-bed reaction for activity testing; and the steps were the same as those in Embodiment 4, with a parameter variation as follows: the catalyst was replaced by the catalyst prepared in Embodiment 3.

Embodiment 7

In this embodiment, the catalyst prepared in Embodiment 1 was used in a fixed-bed reaction for activity testing; and the steps were the same as those in Embodiment 4, with a parameter variation as follows: the catalyst was replaced by the catalyst prepared in Embodiment 2 and then hydrothermally treated at 700° C. for 4 h.

Comparative Example 1

(1) To demonstrate the technical effect of the technical solution of the invention, the invention also provides comparative examples. In this comparative example, the hydrothermal synthesis method as the most commonly used method for synthesizing the SSZ-13 molecular sieve was used, where N,N,N-trimethyl-1-adamantyl ammonium hydroxide (TMADAOH) was used as a template; a feeding ratio is the same as that in Embodiment 3, only with the variations as follows: no iron and copper sources were added in the synthesis process, and silica sol was used to replace the diatomite.

(2) 0.62 g of $Cu(NO_3)_2 \cdot 3H_2O$, 3.22 g of $Fe(NO_3)_3 \cdot 9H_2O$, and 5 g of deionized water were weighed, then mixed evenly, and then slowly dropped to 10 g of the molecular sieve synthesized in step (1); the molecular sieve was sonicated for 2 h, dried at room temperature, then placed in an oven and dried at 120° C. for 8 h, finally roasted in a muffle furnace at 520° C. for 5 h, and then cooled to room temperature.

Comparative Example 2

In this embodiment, the catalyst prepared in Embodiment 1 was used in a fixed-bed reaction for activity testing; and the steps were the same as those in Embodiment 4, with a parameter variation as follows: the catalyst was replaced by the catalyst obtained in Comparative Example 1.

Comparative Example 3

In this embodiment, the catalyst prepared in Embodiment 1 was used in a fixed-bed reaction for activity testing; and the steps were the same as those in Embodiment 4, with a parameter variation as follows: the catalyst was replaced by the catalyst prepared in Comparative Example 1 and then hydrothermally treated at 700° C. for 4 h.

TABLE 1

Test results of all embodiments and fixed-bed reaction based activity testing

|  | Temperature window (° C.) | $N_2$ Selectivity (%) |
|---|---|---|
| Embodiment 4 | 150-700 | >990 |
| Embodiment 5 | 175-700 | >990 |
| Embodiment 6 | 150-700 | >99.5 |
| Embodiment 7 | 130-650 | >99.5 |
| Comparative Example 2 | 200-350 | <90.0 |
| Comparative Example 3 | 200-300 | <35.0 |

Note: The temperature window is a temperature interval when the conversion rate of NO is more than 90%.

As can be seen from Table 1, the mesoporous Fe—Cu—SSZ-13 molecular sieve provided by the invention has an ultra-wide temperature window (especially the activity at medium and high temperature), excellent N2 selectivity, good hydrothermal stability and the like. The method of the invention not only is low in cost, simple in process and easy to operate, but also has good economic and environmental benefits.

Although the invention has been described above with reference to the accompanying drawings, the invention is not limited to the specific embodiments above. The specific embodiments above are only illustrative but not limiting. Those of ordinary skills in the art may also make many variations without departing from the object of the invention under the teaching of the invention, and all of these variations shall fall within the protection of the invention.

What is claimed is:

1. A method of preparing a mesoporous Fe-Cu-SSZ-13 molecular sieve, comprising the steps of:
   (1) activation of minerals: activating an aluminum source, a silicon source, an iron source and a copper source, respectively;
   (2) mixing the activated minerals with sodium hydroxide, water and a seed crystal at 25-90° C., while controlling feeding amounts of respective raw materials so that molar ratios of respective materials in a synthesis system are as follows: $SiO_2/Al_2O_3$=10-100, $SiO_2/Fe_2O_3$=30-3000, $SiO_2/CuO$=1-100, $Na_2O/SiO_2$=0.1-0.5, $H_2O/SiO_2$:10-50, template/$SiO_2$=0.01-0.5; adding an acid source after mixing to adjust pH of the system to 5-13 for first aging; and adding the acid source again to adjust the pH of the system to 5-13 for second aging to obtain aged gel;
   (3) pouring an aged mixture into a polytetrafluoroethylene-lined stainless-steel crystallization kettle for crystallization; after the crystallization is completed, cooling a crystallized product and filtering to remove a mother liquor; washing a filter cake with deionized water to neutrality; drying to obtain a solid; then performing ion exchange on the solid; and filtering, washing and drying the ion-exchanged solid to obtain powder, wherein the drying is performed at 80-150° C. overnight; and
   (4) placing the powder obtained in step (3) in a muffle furnace for roasting to obtain the Fe-Cu-SSZ-13 molecular sieve,
   wherein the content of $Fe_2O_3$ in the mesoporous Fe-Cu-SSZ-13 molecular sieve accounts for 0.1-10% of the total weight of the molecular sieve, in which the content of Fe in a framework accounts for more than 95% of a total iron content, and Fe is evenly distributed within the framework; the content of CuO in the molecular sieve accounts for 0.1-10% of the total weight of the molecular sieve, in which the content of $Cu^{2+}$ accounts for more than 90% of a total copper content, and $Cu^{2+}$ is evenly distributed on an inner surface of the molecular sieve; and
   the mesoporous Fe-Cu-SSZ-13 molecular sieve comprises the following raw materials: the deionized water, the aluminum source, the silicon source, the iron source, the copper source, the acid source, and the template; the aluminum source is one or a mixture of more of mica, alumite, bauxite, diatomite, rectorite, or natural zeolite; the silicon source is one or a mixture of more of bauxite, diatomite, rectorite, natural zeolite, or opal; the iron source is one or a mixture of more of bauxite, diatomite, rectorite, pyrite, mica hematite, or red mud; the copper source is one or a mixture of more of tenorite, bornite, magnetite, malachite, covellite, or chalcopyrite; the acid source is one or a mixture of more of 2-hydroxy-tricarballylic acid, sulfurous acid and nitrous acid, sulfuric acid, hydrochloric acid, nitric acid, oxalic acid, or acetic acid; and the template is one or a mixture of more of diaminomethylpyridine, diaminopropane, p-butylcyclohexanecarboxylic acid, methylediamine, tetraethylenepentamine.

2. The method according to claim 1, wherein both the first aging and the second aging in step (2) are carried out at 10-80° C. and both aging times are 2-12 h.

3. The method according to claim 2, wherein the roasting in step (3) lasts for ~10 h, with a roasting temperature of 500-600° C.

4. The method according to claim 1, wherein in step (2), the molar ratios of respective materials in the synthesis system are as follows: $SiO_2/Al_2O_3$=10-100, $SiO_2/Fe_2O_3$=30-2550, $SiO_2/CuO$=20~100, $Na_2O/SiO_2$=0.1-0.5, $H_2O/SiO_2$=10~50, and template/$SiO_2$=0.01-0.5.

5. The method according to claim 4, wherein the roasting in step (3) lasts for ~10 h, with a roasting temperature of 500-600° C.

6. The method according to claim 1, wherein the amount of the seed crystal added in step (2) is 1-15% of the total man of $SiO_2$ in the synthesis system.

7. The method according to claim 1, wherein the crystallization in step (3) is carried out at 100-190° C., with a crystallization time of 12-120 h.

8. The method according to claim 1, wherein the ion exchange in step (3) comprises the sub-steps of performing ion exchange on the dried solid and 0.1-2M $HNO_3$ solution at a mass ratio of 1:10 to 1:100, and heating and stirring at 10-80° C. for 3-8 h.

9. The method according to claim 1, wherein the roasting in step (3) lasts for 4-10 h, with a roasting temperature of 500-600° C.

10. An application of a Fe-Cu-SSZ-13 molecular sieve prepared by the method according to claim 1 is to selective catalytic reduction reactions of nitrogen oxides.

* * * * *